United States Patent [19]

Ridgley

[11] 4,170,137

[45] Oct. 9, 1979

[54] THERMOMETER AND INTEGRAL JOINT

[76] Inventor: William A. Ridgley, 252 N. Atlanta Ave., North Massapequa, N.Y.

[21] Appl. No.: 944,259

[22] Filed: Sep. 21, 1978

Related U.S. Application Data

[63] Continuation-in-part of Ser. No. 840,649, Oct. 11, 1977, abandoned.

[51] Int. Cl.² .................................................. G01K 1/14
[52] U.S. Cl. ........................................ 73/343 R; 73/375
[58] Field of Search ............... 73/343 R, 375; 65/108; 277/207 A

[56] References Cited

U.S. PATENT DOCUMENTS

| | | | |
|---|---|---|---|
| 1,233,385 | 7/1917 | Maurer | 73/375 |
| 1,373,859 | 4/1921 | Boyce | 73/375 X |
| 2,097,571 | 11/1937 | Moran | 277/207 X |
| 2,139,582 | 12/1938 | Harlow | 73/375 |
| 2,209,179 | 7/1940 | Tate | 73/375 |
| 2,271,193 | 1/1942 | Hohmann | 73/375 |
| 2,273,631 | 2/1942 | Edwards | 73/375 |
| 2,283,360 | 5/1942 | Gedge | 73/375 |
| 2,525,361 | 10/1950 | Lamb | 73/375 |
| 3,080,183 | 3/1963 | Luertzing et al. | 277/207 A X |
| 3,424,838 | 1/1969 | Buus | 65/108 X |

FOREIGN PATENT DOCUMENTS

| | | | |
|---|---|---|---|
| 157010 | 12/1904 | Fed. Rep. of Germany | 73/375 |
| 9870 | of 1895 | United Kingdom | 73/375 |

*Primary Examiner*—Daniel M. Yasich
*Attorney, Agent, or Firm*—Bauer & Amer

[57] ABSTRACT

A thermometer and method of making the same with a separate joint that is made integral with the thermometer body as a substitute for the expensive and normally enlarged glass formed ground joint.

10 Claims, 6 Drawing Figures

THERMOMETER AND INTEGRAL JOINT

FIELD OF THE INVENTION

This application is a Continuation-In-Part of co-pending application Ser. No. 840,649, filed Oct. 11, 1977 and now abandoned.

The present invention relates to thermometers. More specifically, the invention relates to a joint that is formed integral with a thermometer as a substitute for the integrally formed glass ground joint.

BACKGROUND OF THE INVENTION

Many chemical processes and reactions are best performed under carefully-controlled environmental conditions. In order to maintain these conditions, the chemical reaction is often carried out in a closed vessel or chamber. While the reaction is taking place, it is necessary to carefully monitor the internal temperature of the vessel so as to insure that the process is proceeding as desired or anticipated. The vessel is, therefore, typically provided with a sleeve or channel extending outwardly therefrom having a central tapered through-bore communicating with the interior of the vessel. An elongated glass thermometer may be inserted through the channel bore to permit continuous observation and monitoring of the temperature of the process in the vessel.

Such a thermometer is provided for this purpose with an integral enlarged ground glass joint along its length having a tapered configuration substantially conforming to that of the tapered bore of the vessel sleeve. Thus, when the thermometer rod is inserted into the sleeve opening, the tapered joint enlargement seats against and within the defines of said conforming opening to cooperatively form a vacuum-tight seal therebetween. The seal is effective to prevent the escape of fluid from the vessel and to enable the maintenance of the vacuum conditions therein while an immersion portion or end of the thermometer rod is immersed in the fluid within the chamber so as to permit the monitoring of the temperature of the same.

The manner in which an integral, enlarged glass joint is fabricated on the thermometer rod involves a series of time consuming, costly operations. These operations must be performed by skilled personnel who have been specially trained in the art. Moreover, several steps in the procedure require precision glass-working techniques which render the glass rod particularly susceptible to deformation which effectively destroys the thermometer's utility for its intended purpose. Thus, an additional drawback of the integral glass joint-forming procedure is a significant waste of materials upon which skilled work—expensive work—has been performed. Since ultimately the cost of this waste must be passed along to the purchaser, the result is a substantial increase in the market price of such thermometers.

The integral enlarged ground joint is formed on the glass rod prior to the performance of the manufacturing operations that result in a completed temperature measuring rod. Specifically, glass tubing is supplied to the thermometer manufacturer in long lengths. As supplied, the tubing is provided with a uniform internal passageway throughout its length and with a sight stripe of a contrasting color to enable the temperature to be read from the completed thermometer.

A selected length of such glass rod is rotated over an open flame to heat a portion of the glass. When the heated portion of the rod has reached a temperature whereby the glass is sufficiently softened to enable it to be worked, the heated portion is gathered from its ends to form an enlargement on the rod. This enlargement is then ground to a fine taper substantially conforming to that of the opening in the vessel sleeve. After the tapered joint is successfully formed on the rod, a mercury storage bulb is blown thereon and the thermometer completed in a manner well known in the art.

Clearly, the fabrication of such an enlarged ground joint of the thermometer body material itself is an involved procedure that requires the performance of a number of precise operations on the body which are particularly susceptible to damaging the body and rendering it useless as an instrument for the precision measurement of temperature. Thus, if each operation is not correctly performed, the body may be damaged, as, for example, by a slight deformation of the internal passageway or of the sight stripe. It can therefore be appreciated that despite the performance of these operations by highly skilled and trained technicians, a significant amount of waste of the materials employed and of the labors performed thereon will of necessity occur. This will have the effect of significantly increasing the overall manufacturing costs of even satisfactorily manufactured thermometers having ground glass joints formed of the thermometer body material.

The prior art fails to disclose a thermometer having a structural arrangement rendering it applicable as a functional substitute for a ground glass joint thermometer of the type heretofore discussed. For example, U.S. Pat. No. 2,525,361 to A. H. Lamb teaches the combination of a dial-type thermometer having an elongated, rod-like sensing stem, and a tubular, resilient mounting member with a central bore therethrough for slidably receiving the thermometer stem. The mounting member is provided with a circumferential groove to facilitate its permanent securement in an opening of an airplane windshield. The disclosure contemplates the removable insertion of the thermometer stem into the bore for measurement of the air temperature outside of the aircraft.

It is clear that in applications calling for the use of an aforementioned ground glass joint thermometer, the device of Lamb would make an unsatisfactory substitute. Comparable use of the Lamb combination would require the permanent securement of a suitably modified mounting member to the vessel sleeve to enable the fluid-tight or vacuum-tight insertion of a thermometer into the vessel. Furthermore, the fit between the periphery of the thermometer skin and the defines of the mounting member's central bore must be completely tight at the outset to create a vacuumtight seal therebetween. Repeated insertion and removal of the thermometer from the mounting member will act on the defines of the central bore to deform the same, and the elevated temperatures or the chemical compositions of the reacting substance in the vessel could bring about a change in the size of the mounting member's central bore, all to the effect of destroying the required vacuum-tight seal between the thermometer and the mounting member thereof.

U.S. Pat. No. 2,724,274 to R. E. Ross teaches a milk temperature indicator for baby bottles comprising the combination of a dial-type thermometer having a rod-like sensing stem and a circular supporting collar movably positioned about the thermometer stem. The supporting collar is loosely positioned over the bottle mouth to hold the thermometer stem in submerged relation to the milk in the bottle while the indicating dial is maintained above the bottle to enable the monitoring of the temperature of the milk. Ross does not teach a vacuum-tight fit between the thermometer stem and the movable supporting member, nor does it contemplate such a seal between the supporting member and the opening in the bottle atop which it is to be loosely placed. There is, in addition, no suggestion of how it could be modified to provide such a vacuum-tight seal. The Ross combination would, therefore, as was the case with Lamb, also make an unsatisfactory substitute for a rod-like thermometer having an integral enlarged ground glass joint formed of the thermometer glass along the length thereof. Thus, the prior art teaches no adequate substitute for the expensive integrally formed glass ground joint.

The aforementioned patents are exemplary of the shortcomings of the prior art.

The desideratum of the present invention is to overcome the aforedescribed problems associated with the prior art. An object of the present invention is to avoid the significant waste of time and materials involved in the fabrication of ground glass joint thermometers in the manner described which results from degradation and deformation of the thermometer rod. This wastage, which is recognized to be an inherent disadvantage of the ground glass joint fabrication process, results in higher manufacturing costs which are reflected in the cost of such thermometers to consumers.

Another object of the present invention is to provide a method for manufacturing thermometers with a separate joint equivalent to the aforedescribed ground glass joint, but having the integral ground glass joint thereon joint, that is formed of the thermometer body while avoiding those fabricating operations involving a high risk of damage to the thermometer body.

Still another object of the invention is to provide a thermometer with a joint for use in accomplishing the aforedescribed purposes in which the joint is made separate from, rather than as a part of, the thermometer body, but which joint, when applied to the thermometer body becomes an integral part thereof, functioning as a substitute for the integral ground glass joint, and yet accomplishing the same purposes as the same.

Further objects, features and advantages of the present invention will be more fully appreciated by reference to the following detailed description of presently preferred, but nonetheless illustrative embodiments in accordance with the present invention, when taken in conjunction with the accompanying drawings.

BRIEF DESCRIPTION OF THE DRAWINGS

In the Figures of the drawing, wherein like reference numerals denote like elements therein.

DETAILED DESCRIPTION OF THE PREFERRED EMBODIMENTS

The present invention represents an important contribution in the elimination of significant problems associated with the fabrication of ground joint thermometers. A full appreciation of this contribution, however, is dependent upon a complete understanding of the relevant prior art. A detailed description of the prior art ground glass joint thermometer, and of the fabrication of the same, is therefore included to facilitate such understanding.

Figure 3:
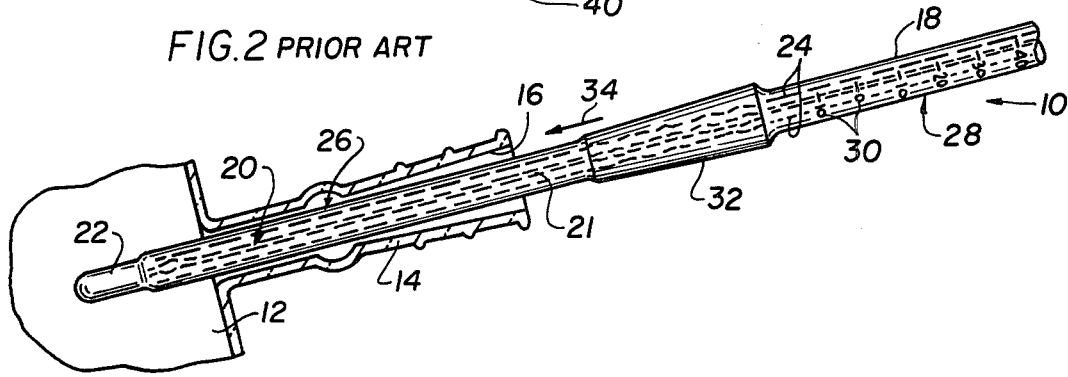
FIG. 3 is a perspective view, partly in section, of a prior art ground joint thermometer partially inserted into the tapered receiving sleeve of a fluid-containing vessel, the internal temperature of which is to be measured.

Turning now to the drawings, there is shown in FIG. 3 a typical prior art glass ground joint thermometer, identified generally by the reference numeral 10, and a vacuum-type vessel 12 which is provided with a tubular receiving sleeve 14 extending outwardly from the vessel 12. The tubular sleeve 14 includes a tapered opening 16 to provide access to the vessel through such sleeve 14 to enable the thermometer 10 to be inserted into the vessel to determine and monitor the temperature of fluid therein. The prior art thermometer 10 is shown to comprise an elongated glass body in the form of a rod 18 of generally circular cross-sectional configuration having an internal mercury chamber 20 extending substantially throughout its length. The chamber 20 includes a bore or passage 21 of essentially uniform diameter extending longitudinally through the rod, said passage 21 being closed proximate one end of the rod 18 (not shown) and fluidly communicating at an opposite end thereof with a bulb 22 for storing a quantity of mercury and for supplying the same to the passage 21. The diameter of the bore 21 must be uniform throughout the length thereof to ensure the precision measurement of temperature by the thermometer 10.

A sight stripe 24 is provided along at least a portion of the length of the rod 18 to render the chamber 20 visible for viewing the mercury therein. The stripe 24 is integrally formed internally of the outer periphery of the rod 18 during the fabrication of the same, although the stripe could alternatively be painted directly on the surface of the rod after its formation is complete. In addition, while typically the stripe 24 is yellow in color, it should be clear that the actual color of the same is a matter of design choice and need only satisfy the requirement that it provide sufficient contrast to enable the determination of the level of the mercury in the passage 21 when the same is viewed against the backdrop of the stripe 24.

The thermometer 10 further comprises an immersion portion 26, which includes the bulb 22, and a scale reading portion generally referenced by the numeral 28. Indicia 30, which are provided on the scale reading portion 28 and which may be stamped on the outer periphery of the rod 18, cooperate with the sight stripe 24 and the mercury in the passage 21 to enable the user to read directly therefrom the temperature of the fluid in the vessel 12 and in communication with the exterior surface of the bulb 22.

An enlarged, smoothly ground glass joint 32 is seen in FIG. 3 to be provided on the rod 18 intermediate the immersion and scale reading portions 26 and 28 thereof. The joint 32 is formed integral with the rod 18 of the glass of the thermometer body in a manner to be described to have a longitudinally tapered peripheral configuration.

In practice, a user wishing to measure the internal temperature of the vessel 12 inserts the prior art thermometer 10 through the opening 16 in the vessel sleeve 14 in the direction indicated by the arrow 34. As the thermometer 10 is moved leftward in FIG. 3 to position the bulb 22 within the chamber 12, the external surface of the smooth joint 32 contacts the internal defines 16 of the sleeve 14 to prevent further leftward relative movement. The taper of the joint 32 and its abutment with the taper 16 of the sleeve 14 facilitates the completion of a vacuum-tight closure of the opening 16 to enable the maintenance of a vacuum in the vessel 12. Once the joint 32 is vacuum-tightly seated in the sleeve 14, the internal temperature of the vessel 12 may be read directly from the scale reading portion 28 of the thermometer 10.

In a manner well known in the art, a unitary increase in the temperature of the vessel fluid surrounding the bulb 22 causes a corresponding unitary increase in the volume of the mercury in the chamber 20. If the diameter of the passage 21 is uniform throughout its length, such a unitary volumetric increase will result in a determinable rise in the level of mercury therein and enable the thermometer 10 to accurately measure a fluid's temperature when readings are taken in conjunction with the indicia 30 on the rod 18. It should be clear, though, that any variation in the uniformity of the diameter of the passage 21, however slight, will destroy the correlation between unitary rises in the mercury level and the positions of the cooperating indicia 30 stamped on the scale reading position 28 and render the thermometer relatively useless for precision temperature measurement.

Figure 1:
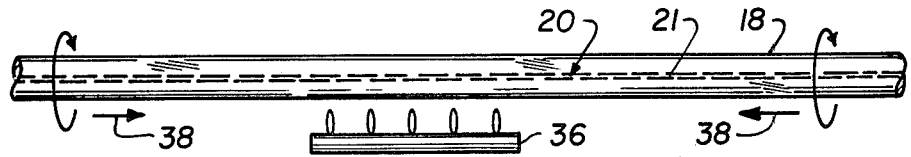
FIG. 1 is a view of a first step in the process of fabricating a prior art glass ground joint thermometer according to the prior art.

Fabrication of the prior art ground glass joint on the thermometer 10 is a complex, precision operation and is, as a result, quite costly. Long lengths of glass tubing provided with an internal bore 21 and a sight stripe 24 are provided by glass manufacturers to a thermometer manufacturer. The thermometer manufacturer then cuts up these long lengths into selectively shorter lengths which are more reasonably usable for different size thermometers. As illustrated in FIG. 1, the ground joint fabrication process is initiated by using a selected length of glass rod 18 having said uniform internal bore or passage 21 extending throughout the full lengths thereof. Although not depicted in FIG. 1, the rod 18 is also provided with an internal sight stripe 24.

The rod 18 is secured at its ends to a glass lathe or the like (not shown) for rotation of the ends at equal speeds so that the entire length of the rod 18 turns in unison. As it rotates, the glass is heated by a heating means 36 at the proper position of its length wherein the ground joint 32 is required to be provided and for an additional predetermined portion of the length of the rod 18 on either side of said proper position. Typically, an area of approximately three inches in each direction along the length of the rod 18 from the place where the ground joint is to be fabricated is often times heated.

Figure 2:
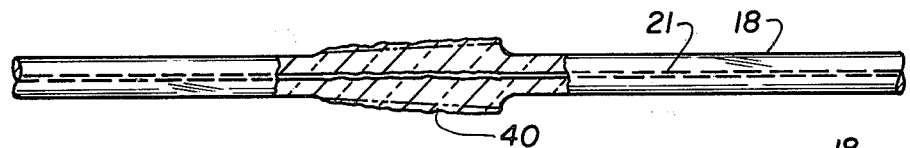
FIG. 2 is a view of another step in the process of fabricating a prior art glass around joint thermometer including an unfinished integral ground joint formed thereon.

Subsequently, the rotation of the rod 18 is discontinued and the heat softened glass is gathered inward from the longitudinal softened glass extremes of the surface of the thermometer body, in the directions indicated by the arrows 38 in FIG. 1. This gathering of the heated softened glass results in the accumulation and creation of a bulge 40 about the outer circumference of the rod 18, as shown in FIG. 2. As depicted therein, the bulge 40 will initially have a roughened outer periphery. The rough bulge 40 is then tapered as desired and ground smooth on a grinding machine to attain the desired finished, tapered ground joint shown in FIG. 3.

If the ground joint forming operations have been successful, the glass rod 18 carrying an integral ground glass joint thereon is now ready to be formed into a calibrated thermometer in a manner well known in the art. Specifically, this process is begun by measuring the diameter of the passage 21 so as to enable the prefiguring of the length of the bulb 22. The immersion portion 26 is then measured from the ground joint 32 and marked off to a desired length, and the rod 18 is blistered to enable the prefigured bulb 22 to be blown onto its end. Manufacture of the thermometer is completed by filling the bulb 22 and passage 21 with a predetermined quantity of mercury, sealing the mercury chamber 20 and stamping the indicia 30 in proper temperature indicating position on the scale reading portion 28.

Extreme care must be taken in performing the ground joint forming operations on the glass rod 18. If during the heating, the accumulating of the glass to form the bulge 40 or the grinding steps are imperfectly or imprecisely performed, the glass rod 18 could acquire a bend, the internal passageway 21 could become deformed and/or the sight stripe 24 could become distorted. As previously noted, even the slightest deformation of the internal diameter of the passage 21 or the creation of the smallest bend in the bore 21 or of the rod 18 will render the thermometer useless for the precision measurement of temperature. A thermometer so damaged will generally be discarded as unsaleable. A distortion in the sight stripe 24 will, likewise, prevent the sale of a thermometer made therefrom as a perfect unit. It can, therefore, be appreciated that a great deal of waste is an inherent by-product of the process by which the ground glass joint of the prior art is fabricated. The added expense of such waste must naturally be passed on to the consumer who purchases such ground glass joint thermometers.

The present invention avoids the complexities of the ground glass joint fabricating process of the prior art and effectively eliminates the waste resulting from imperfectly performed operations, thereby reducing the overall manufacturing costs involved. The present invention provides for all of the benefits of the integral glass ground joint of FIG. 3 without the problems by producing the thermometer and the joint separately, premanufactured and thereafter connected to form a single unitary structure, as if the same were integrally fabricated.

Figure 4:
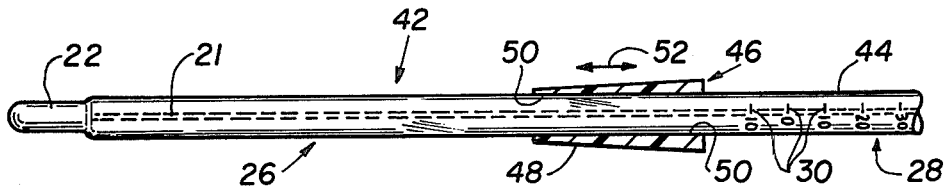
FIG. 4 is a sectional view of part of a thermometer constructed according to the teaching of the present invention showing the substitute joint positioned in encircling relation about the thermometer body.

As seen in FIG. 4, an elongated, rod-like glass thermometer generally identified by the reference numeral 42 is provided. The thermometer 42 has the same general arrangement as the prior art thermometer 10 of FIG. 3, but without the integral ground joint structure 32. More particularly, the thermometer 42 comprises a glass rod 44 of general circular cross-sectional configuration having a mercury storage bulb 22 at one end thereof and a uniform bore 21 extending throughout the length of the rod 44 and communicating at one end thereof with the bulb 22. A sight stripe, not shown but the same as 24 in FIG. 3, and temperature measurement indicia 30 are also provided on the rod 44. The thermometer 42 similarly includes an immersion portion 26 and a scale reading portion 28 to enable the temperature to be read from the scale reading portion 28 while the portion 26 of the thermometer 42 is concurrently immersed in a fluid whose temperature is to be measured.

A frusto-conical joint or connecting member, generally identified by the reference numeral 46, is seen in FIG. 4 positioned about the rod 44 intermediate the immersion portion 26 and the scale reading portion 28. The member 46 comprises an elongated sleeve 48 of a selected length substantially less than that of the rod 44. The sleeve 48 is preferably of circular cross-sectional configuration, although a special application might require another shape and the sleeve 48 could, in such a situation, be configured to satisfy such requirement. The member 46 may be longitudinally tapered, as illustrated, to assume the same shape as the prior art joint 32 to enable the same to perform the same functions in the same manner.

The sleeve 48 includes a hollow interior 50 preferably of an essentially uniform cross-sectional configuration that conforms to and coincides with the circular outer periphery of the rod 44 and that extends longitudinally throughout the length of the connecting member 46. The uniformly configured sleeve interior 50 enables it to be positioned on the rod 44, in a manner to be described, such that a vacuum-tight seal is defined therebetween. As previously explained, maintenance of a pressurized or a vacuum condition in the vessel 12 during internal temperature measurement thereof requires that insertion of a thermometer through the vessel sleeve 14 results in a complete closure of the opening 16. A vacuum-tight seal is, therefore, necessary between the rod 44 and the connecting member 46 to prevent the possibility of fluid flow therebetween.

In use, the sleeve 48 is liable to be exposed to extreme conditions of temperature and pressure. It is, thereof, important that the material of which the connecting member 46 is fabricated be able to withstand such conditions. In addition to its ability to withstand temperature and pressure extremes, it should be substantially inert to chemical attack, since chemicals exposed in the vessel 12 to such environmental extremes may be sufficiently agitated to enter the vessel sleeve 14 and come into contact with the connection member 46. Although a number of thermoplastic and thermosetting materials may be used, it has been found that certain synthetic resin polymers, such as synthetic tetrafluorethylene resin sold commercially under the trademark Teflon, satisfy these requirements. It is also recognized that particular applications may require lesser or greater abilities to withstand specified conditions, and in such situations, the material of the sleeve 48 may be appropriately chosen therefor. Thus, the recitation of polymers such as Teflon as the preferred construction material should not be construed as a limitation upon the invention taught herein.

Following fabrication of the connecting member 46, the same is slidingly positioned about the outer periphery of the thermometer rod 44 is encompassing relation thereto, as shown in FIG. 4. The sleeve 48 may then be positionally adjusted along the length of the rod, as indicated by the two-headed arrow 52, to provide a predetermined length for the immersion portion 26.

Preferably, the hollow interior 50 of the sleeve 48 is slightly smaller than the outer periphery of rod 44 to which it substantially conforms in configuration to facilitate the completion of a fluid-tight seal between the rod 44 and the sleeve 48 selectively positioned thereon. Thus, it may be necessary to initially heat the sleeve 48 prior to its engagement with the rod 44 to cause the sleeve 48 to soften and expand and thereby enable its sliding movement on and selective positioning along the rod 44. Upon cooling, the sleeve 48 will harden and contract about the thermometer body to cause its hollow interior 50 to grip the outer periphery of the rod 44 so tightly that the member 46 effectively becomes immovably affixed to the rod 44 such that relative movement between them is thereafter prevented. This gripping engagement along the length and throughout the related surface 50 of the member 46 with the corresponding surface of the rod 44 is so complete that nothing can flow or pass through or between the engagement. As a consequence, it will be recognized that the connection or engagement is fluid-tight as well as vacuum-tight.

Although not necessary, the sleeve 48 may be heat welded or adhesively bonded to the external surface of the rod 44 to become a recognizably permanent fixed part thereof. Other methods of adhesion known to those skilled in the art may alternatively be employed to complete the bond between the connecting member 46 and the rod 44. But, in no event is the thermometer body 44 ever distorted during such procedures. If required, the outer surface of the sleeve 48 may be further ground or shaped after its application to the thermometer body.

Measurement of the temperature of fluid contained in the vessel 12 is performed in a manner identical to that described with respect to the prior art ground joint thermometer 10 of FIG. 3. It can, therefore, be seen that while the resultant thermometer of both the process by which the prior art ground joint thermometer is fabricated and the method by which the inventive substitute immersion thermometer is manufactured are for practical purposes the same, the processes themselves are quite different. The prior art fabrication method involves a high measure of risk in terms of manufacturing efficiency and cost in that the forming of the ground joint 32 on the thermometer rod 18 is quite susceptible to distortion of the mercury passage 21 and, indeed, of the rod 18 and sight stripe 24 thereon. The present invention, on the other hand, anticipates the initial fabrication of a completed, elongated rod-like thermometer and the separate manufacture of a connecting joint member 46, and the subsequent vacuum-tight joining of the two to form a single, unitary immersion thermometer which performs in a manner equivalent in all respect to the prior art ground glass thermometer. Because no potentially damaging heating or accumulating operations need be performed on the rod 44, the possibility of damage to the rod or to the internal mercury passage 21 is obviated, and the inefficiencies and overall manufacturing costs in constructing such thermometers are thereby significantly reduced.

Figure 5:
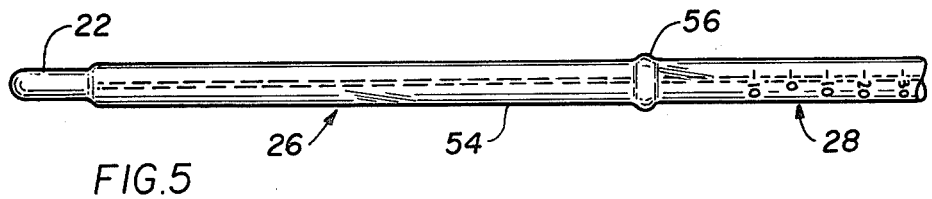
FIG. 5 is a partial view of an alternative embodiment of the thermometer body of the present invention including an enlarged portion integral therewith.
Figure 6:
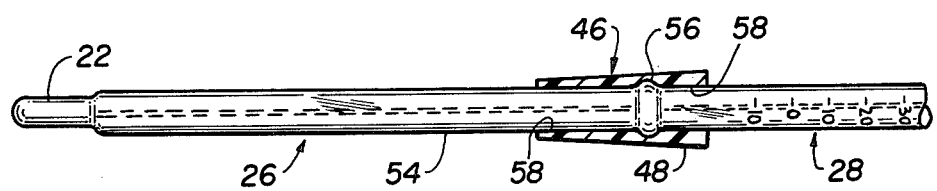
FIG. 6 is a view similar to FIG. 5 showing the substitute joint positioned about the enlarged portion of the thermometer body according to the present invention.

FIGS. 5 and 6 illustrate another embodiment of the present invention. The general details of a thermometer rod 54 thereshown are in all respects identical to the thermometer 42 of FIG. 4. Hence, a repetition of such details would be redundant and superfluous and is, therefore, omitted. However, the glass rod 54 thereshown is provided with an integral projecting distortion which may be in the form of external abutment, protrusion, rib or ridge or other obstruction 56 which is seen to encircle the outer peripheral surface of the rod intermediate the immersion and scale reading portions 26 and 28 thereof.

In joining the glass rod 54 and the initially separate joint member 46 to form an integral structure, the member 46 is first heated to soften its material of construction and enable it to temporarily expandingly slide over the distortion 56 in a manner to be described. When the initially separate joint member 46 is heated and moved or slid along the rod 54 to the desired lengthwise position thereon, it must distort and temporarily expand and ride over the protruding distortion or ridge 56. As seen in FIG. 6, it is preferred that the length of the distortion 56 longitudinally along the rod 54 is notably or substantially less than the length of the sleeve 48 such that when the sleeve 48 is located in the desired position and directly over and encircling the distortion 56, it fully and completely encompasses the distortion.

Each of the longitudinally opposite ends of the sleeve 48 extends beyond the longitudinally disposed edges of the distortion 56 to substantially fluid-tightly engage and grip encirclingly about the periphery of the rod 54 beyond the distortion 56 much in the manner described with regard to the embodiment of FIG. 4. As a consequence, the provision of a fluid-tight seal between the joint or connecting member 46 and the rod 54 is significantly facilitated and enhanced since the distortion 56 fully encompassed within and cooperating with the hollow interior surface 58 of the sleeve 48 performs the function of a barrier or obstruction to the lengthwise passage of fluid or vacuum therebetween. Thus, when the connecting member 46 is permitted to cool and consequently contract about the distortion 56 and the adjacent undistorted peripheral surface of the thermometer rod 54, an absolutely complete fluid-tight and vacuum-tight seal therebetween is assured.

The provision of the distortion 56 fully encompassed by the connecting member 46 and the extension of the longitudinally opposite ends of the member 46 encirclingly about the undistorted adjacent periphery of the rod 54 has the additional effect of retaining and locking the connecting member 46 at the desired lengthwise position along and about the rod 54. As a consequence of the obstruction effected by the distortion 56, it is impossible for anything to flow over and beyond the distortion once the member 46 returns to its non-softened, hard gripping engagement with the rod 54. Thus, even when the member 46 is subjected to extreme heat, it cannot be moved from its positive engagement about the distortion because the distortion functions as an obstruction or abutment to prevent any such movement. Moreover, by reason of the fact that the outer circumference of the distortion actually distorts the inner peripheral surface 58 of the member 46, the member 46 is tightly compressed about all of its points of engagement with the distortion so that thereafter neither relative movement nor disengagement between the two can ever occur under normal conditions of use.

As previously described with regard to the thermometer embodiment of FIG. 4, the hollow interior bore or passageway extending for the length of the connecting member 46 is preferably of essentially uniform cross-section therethrough. In the modified thermometer of FIGS. 5 and 6, the provision of a uniform cross-section of the hollow interior 50 advantageously enables the inner surface 58 of the sleeve 48 to grip fluid-tightly about the undistorted outer periphery of the rod 54 while the portion of the sleeve 48 in the area of and about the distortion 56 deforms to closely and tightly encircle the same. Were the sleeve interior 50 of non-uniform cross-section, an absolutely fluid-tight contraction of the sleeve 48 about the rod 54 could not be assured.

It is anticipated that the outer surface of the connecting member 46 be ground or otherwise shaped or finished after the same has been desirably positioned along the length of the rod. Such grinding may, by way of example, be utilized to provide a longitudinally tapered joint functionally equivalent to the integral ground glass joint shown in the prior art thermometer of FIG. 3, although it is within the contemplation of the present invention that the substitute joint taught herein could assume any of an endless variety of special purpose configurations not attainable in accordance with the prior art. In any event, subsequent grinding or shaping of the connecting member 46 dictates that the projecting height of the distortion 56 from the body or undistorted outer periphery of the thermometer rod 54 may not be such as to affect the unitary integrity of the sleeve 48 after the same has been so finished. Accordingly, it is necessary that final shaping of the connecting member 46 leave sufficient material thickness thereon to permit the same to structurally engage fluid-tightly about the distortion 56 and the undistorted outer periphery of the thermometer rod 44 adjacent thereto. Beyond this general requirement, those skilled in the art will readily appreciate that the length and height of the distortion 56 on the rod 54 of the material thickness of the sleeve 48 are merely matters of design and engineering choice and as such are not to be construed as limiting on the scope of the invention.

Likewise, the distortion 56 may assume any of a variety of configurations or shapes for enhancing the provision of a substantially fluid-tight seal, and the distortion may be formed on the rod 54 in the same manner previously described for fabricating the integral ground joint of FIG. 3. It should be noted, however, that due to the significantly reduced amount of glass necessarily accumulated in forming a distortion 56 as compared to that required for a complete ground glass joint 32, the possibility of accidental ruinous deformation of the rod 54 or of the mercury passage 21 therethrough in the course of performing such accumulating operations is appreciably lessened. As a consequence, the joined thermometer of FIGS. 5 and 6 retains the significant practical advantage of the embodiment of FIG. 4 in enabling the manufacture of a thermometer having an integral joint without the appreciable risk of inadvertent deformation to the thermometer which effectively destroys its intended utility while providing an enhanced fluid-tight seal between the thermometer body and the joint or connecting member.

A latitude of modification, change and substitution is intended in the foregoing disclosure. For example, the cross-sectional configuration of the thermometer rod need not be generally circular but could, by way of illustration only, be triangular or square. Although it would be extremely difficult, and therefore quite costly, to successfully fabricate an integral ground glass joint on a triangularly cross-sectionally configured rod according to the prior art, the present invention would enable such a joint to be easily affixed to the rod merely by conforming the opening in the connecting member to the cross-sectional shape of the thermometer rod, thereby constituting significant savings in manufacturing costs. Thus, the present invention enables a wider variety of rod-like thermometers to be equipped with an enlarged joint for use in determining a fluid temperature in a pressurized or vacuum vessel and in similar applications.

Reference throughout the specification and claims has been made interchangeably to the terms "vacuum-tight" and "fluid-tight" to indicate that each is to be interpreted broadly to include the other and that the scope of the application and the claims is not to be limited in meaning to either one of such terms. The same is also true of the references to the "pressurized" and "vacuum" conditions described. Since a vacuum condition is the negative of a pressurized condition, it is intended that the use of one term to describe one condition be interpreted to mean and include the other condition.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the invention, therefore, to be limited only as indicated by the scope of the claims appended hereto.

What is claimed is:

1. A thermometer comprising:
   an elongated glass thermometer rod having an outer periphery of a predetermined configuration, a mercury chamber of uniform diameter throughout the length of the rod and a sight stripe along the length of the rod and spaced from the mercury chamber to render the same visible for viewing the mercury therein, said rod being of a predetermined length to provide for a thermometer of a preselected length;
   a separate plastic connecting member for engagement with containers and the like of a length substantially less than that of said thermometer rod, said connecting member having a selected cross-sectional configuration and a hollow interior of a configuration conforming to the outer periphery of the glass thermometer rod and said thermometer rod extending longitudinally through said connecting member for the length thereof, whereby the separate connecting member is adapted to encompass and be positioned about the outer periphery of said glass thermometer rod with the conforming interior opening of the separate connecting member mating with the outer periphery of the glass thermometer rod to define a fluid-tight seal therebetween, said glass thermometer rod and said separate connecting member each being initially separate elements complete in themselves and said separate connecting member having an end shape along the length of its outer periphery such that when the separate connecting member is positioned in encompassing relationship with the outer periphery of the glass thermometer rod it is moved to a selected point along the length of said glass rod to thereafter form an integral and unitary part of the thermometer as though it were initially formed therewith and to function as the sole joint of the thermometer;
   and means at said selected point along and integral with the thermometer rod to distort and unitarily connect said separate connecting member and said glass thermometer rod at said selected point fluid-tightly and against relative movement such that said glass thermometer rod and said connecting member are essentially one;
   said distortion means having a length longitudinally along said rod substantially less than the length of said connecting member such that when said connecting member is positioned in encompassing relationship with the outer periphery of said rod at said selected point the connecting member completely encompasses said distortion means and the longitudinally opposite ends of said connecting member extend beyond said distortion means to engage fluid-tightly about the outer periphery of said rod.

2. In a thermometer according to claim 1,
   said connecting member being fabricated of a synthetic resin polymer.

3. In a thermometer according to claim 1,
   the hollow interior of said connecting member having an essentially uniform cross-section configuration throughout its length for cooperative encompassing engagement about said distortion means and the outer periphery of said thermometer rod beyond the longitudinally opposite ends of said distortion means to enhance said fluid-tight connection between said connecting member and said thermometer rod.

4. In a thermometer according to claim 3,
   said distortion means comprising a circumferential rib defined on the outer periphery of the thermometer rod to facilitate the completion of said fluid-tight seal between the rod and said connecting member.

5. In a thermometer according to claim 3,
   said distortion means having a selected height from the outer periphery of said thermometer rod such that when said sleeve is positioned at said selected location the sleeve may be ground to a taper along its length without affecting the unitary integrity thereof and leaving sufficient thickness to said sleeve to enable the same to structurally engage about the outer periphery of said thermometer rod fluid-tightly at longitudinally opposite ends of said distortion means while completely encompassing the same.

6. In a thermometer according to claim 1,
   said connecting member having a substantially circular cross-sectional configuration.

7. In a rod-like thermometer for use with containers and the like having an immersion portion for insertion into an opening provided therefor in a vacuum chamber and a scale reading portion for projection from the chamber to facilitate measurement of the temperature of the same and a joint immovably secured unitary and fluid-tightly therewith for maintaining the thermometer in fixed fluid-tight relation to the chamber,
   said joint being a separate frustoconical plastic sleeve having a bore longitudinally defined throughout its length for encircling engagement with the thermometer at a selected location intermediate the immersion and scale reading portions thereof, said separate sleeve being permanently and fixedly secured to the thermometer at said selected location as though the same were initially formed integral therewith and forming a fluid-tight seal between said sleeve and thermometer to complete a fluid-tight closure of the vacuum chamber opening when said sleeve is positioned relative thereto so as to maintain a vacuum in the chamber during measurement of the temperature therein, whereby said sleeve and thermometer are separately and non-integrally preformed prior to mutual securement to each other so as to enable their relative movement to facilitate the selective positioning of said sleeve intermediate the immersion and scale reading portions of the thermometer, and distortion means on the thermometer of a length substantially less than said joint and engaged by said separate sleeve during the selective positioning of said sleeve for integrally securing said sleeve and thermometer fluid-tightly and against relative movement at said selected location to form an integral, unitary structure with said sleeve being the sole joint for the thermometer, each of the longitudinally opposed ends of said sleeve extending beyond said means in tightly encircling engagement about the thermometer when said sleeve is positioned at said selected location to completely encompass said means in a fluid-tight seal and abutting longitudinal positioning engagement between the thermometer and said sleeve.

8. In a thermometer according to claim 7, said plastic sleeve having the property of being substantially inert to chemical attack.

9. In a rod-like thermometer according to claim 7 wherein the thermometer has an outer periphery of a predetermined configuration, said means including a distortion in the outer periphery of the thermometer rod at said selected location along the length thereof and said distortion having a length less than the length of said sleeve so as to enable the sleeve to completely encompass and extend beyond the longitudinally opposite ends of said distortion to tightly engage about the outer periphery of the thermometer and enhance said fluid-tight engagement between the thermometer and said sleeve.

10. In a thermometer according to claim 7, said bore longitudinally defined throughout the length of said separate sleeve being of a substantially uniform cross-sectional configuration throughout its length to complete said fluid-tight seal between the thermometer and said sleeve when said sleeve is fixedly positioned at said selected location encompassingly about said means.

* * * * *